Sept. 24, 1929.    H. FORD    1,729,421
STARTER GEAR
Filed June 16, 1928
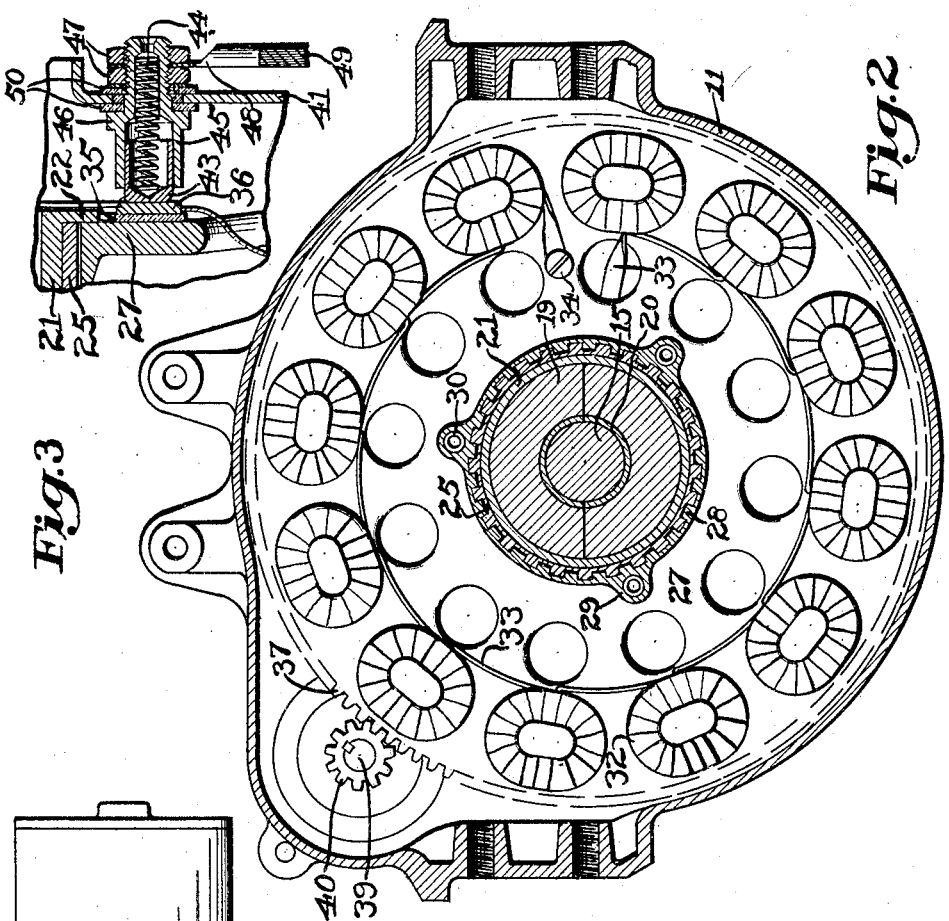
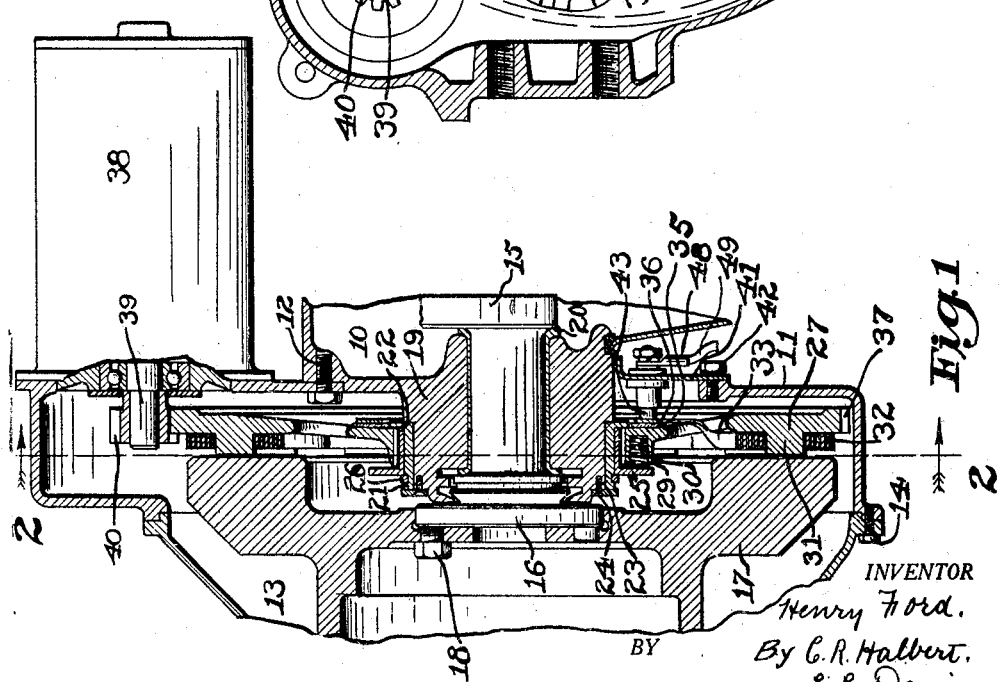
INVENTOR
Henry Ford.
BY C. R. Halbert.
E. L. Davis.
ATTORNEYS.

Patented Sept. 24, 1929

1,729,421

UNITED STATES PATENT OFFICE

HENRY FORD, OF DEARBORN, MICHIGAN

STARTER GEAR

Application filed June 16, 1928. Serial No. 285,906.

The object of my invention is to provide a starting gear of simple, durable and inexpensive construction.

Still a further object of my invention is to provide a starting gear for connecting a starting motor with an internal combustion engine whereby a temporary connection may be made between the starting motor and the crankshaft of the internal combustion engine for the purpose of starting the engine but this connection will be absolutely severed as soon as the engine has been started.

Still a further object of my invention is to provide a starting gear for use in connection with an internal combustion engine wherein the gear teeth will be in mesh at all times and a clutch may be provided for engaging one of the gears with a crankshaft of the engine to drive the latter from the starting motor.

Still a further object of my invention is to provide a starting gear in which the starting motor is mounted on the flywheel housing and a small gear fixed to the starting motor meshes with a large gear which is journaled concentrically relative to the crankshaft of the engine and which is provided with a clutch device adapted to engage the flywheel of the engine when the starting motor is operated.

Still a further object of my invention is to provide a starting motor having a gear fixed thereto which is always in mesh with a relatively large gear journaled on the flywheel housing of the engine and to provide an electric clutch device between the large gear and the engine flywheel which will automatically engage when the starting motor is being energized but will automatically disengage as soon as the starting motor is no longer energized.

With these and other objects in view, my invention consists in the arrangement, construction, and combination of the various parts of my improved device, as described in the specification, claimed in the claims, and illustrated in the accompanying drawings, in which Figure 1 shows a sectional view taken on a plane intersecting the axes of the crankshaft and starting motor shaft of an internal combustion engine.

Figure 2 shows a vertical sectional view taken on the line 2—2 of Figure 1, and

Figure 3 shows an enlarged detailed sectional view illustrating the construction of the brush used with the electric clutch.

Referring to the accompanying drawings, I have used the reference numeral 10 to indicate generally the crankcase of an internal combustion engine. This crankcase has a flywheel housing 11 secured thereto in any suitable manner as by means of screws 12. A clutch housing 13 extends rearwardly from the flywheel housing and is secured thereto in any suitable manner as by means of screws 14. A crankshaft 15 for the internal combustion engine has the bolting flange 16 at the rear end thereof to which a flywheel 17 is secured in any suitable manner as by means of cap screws 18. The crankcase 10 has a vertical web 19 at the rear end thereof which forms a support for the bearing sleeve 20 which forms the rear main crankshaft bearing.

A bearing sleeve 21 having a flange 22 at the forward end thereof is mounted on the bearing boss of the web 19 rearwardly of the crankcase 10 by means of a removable ring 23. This ring is made removable by a plurality of screws 24 which extend into the bearing boss of the web 19. A second bearing sleeve 25 is removably journaled on the sleeve 21 by means of a slit resilient ring 26. This bearing sleeve 25 is fixed from rotation relative to a spider 27 in any suitable manner as by splines 28. It will thus be seen that the spider 27 is mounted to rotate relative to the crankshaft 15 and to move axially relative thereto. The spider 27 is provided with a plurality of integrally cast sockets 29 which are designed to receive springs 30 which bear against the annular flange at the rear end of the sleeve 25 and against the bottom of the sockets 29 to thereby yieldingly urge the spider 27 to its forward position.

Core members 31 are cast integrally with the spider 27 adjacent to its periphery and at intervals around this periphery so that flat coils 32 may be secured onto the spider around said cores 31. These coils 32 are all connected together in series by a plurality of wires 33 so that these coils are all in series. The end of the last coil is grounded onto the spider 27 in any suitable way as by means of a screw 34. A ring of insulating material 35 is secured to the forward surface of the spider 27 near the center thereof and a brush ring 36 is secured to the insulating ring forwardly thereof so that the brush ring 36 is supported by but insulated from the spider 27. This brush ring 36 is connected to the second end of the wire 33 in any suitable manner so that any current which is received by this brush ring 36 will pass through all the coils and through to the ground to thereby energize these coils and cause them to become magnets.

From the foregoing it will be seen that if these coils are energized, the mounting of the spider 19 permits axial movement of the spider to move the cores 31 into contact with the forward face of the flywheel 17 thereby locking the spider 27 from rotation relative to the flywheel 17.

The periphery of the spider 27 is provided with teeth 37. A starting motor 38 is mounted on the flywheel housing 11 in any suitable manner and the shaft 39 thereof extends into the flywheel housing parallel with axis of the crankshaft 15. A starter gear 40 is fixed to the end of the shaft 39 in position to constantly mesh with the teeth 37 of the spider 27 whereby the spider 27 may be driven by the starting motor in any of its axially adjusted positions. From the foregoing it will be seen that if the coils 32 are energized at the same time that the starting motor is energized, then that the starting motor will be connected to the flywheel 17 so that it may be driven thereby through the gear 40 and the teeth 37. Whenever the coils 32 are de-energized the connection will be broken and the springs 30 will push the spider 19 out of engagement with the flywheel 17 thereby entirely releasing the connection between the two and permitting the flywheel 17 to rotate freely relative thereto. The springs 30 will prevent any tendency to rattle and hold the spider 19 in its inoperative position. In this connection it will be noted that the latter is mounted to rotate on the bearing boss of the web 19 so that there are no moving parts associated with the starter drive when the latter is not being operated to start the motor.

A bracket 41 is removably secured to the flywheel housing by the screw 42 and is designed to support a brush contact designed to carry the current to the brush ring 36 so as to energize the coils 32. This bracket 41 has the brush member 43 yieldingly mounted thereon and insulated therefrom so that it may be yieldingly urged into contact with the brush ring 36. The brush 43 is hollow and has a spring 44 seated in this hollow. A hollow shank 45 slidingly receives the brush 43 and one end of the spring 44, said shank having a shoulder 46 about the middle thereof. The forward end of this shank is contracted and the extreme forward end is threaded. A pair of nuts 47 are screwed onto the threads and designed to receive the terminal 48 of the input wire 49 of the electric circuit for the coils 32 and to make an electrical contact therewith so that the current may pass from the wire 49 to the brush 43. The shank 45 is insulated from the bracket 41 by three insulating washers 50 which prevent metal to metal contact between the shank 45 and the bracket 41. These washers are held in place on the shank and the bracket by the rear nut 47 and the shoulder 46. From the construction of the parts just described it will be seen that the spring 44 continuously urges the brush 43 into contact with the brush ring 36 in any of the positions of the spider 27 so that whether the spider is rotated or moved axially the current may still be supplied thereto when desired.

When this device is hooked up to be used as a starting gear, the coils 32 are connected in parallel with the starting motor so that whenever the starting motor is turned on to start the engine the coils 32 will be energized to clutch the spider 19 to the flywheel 17 so that rotation of the starting motor will rotate the flywheel 17 and consequently start the engine. Whenever the current is turned off of the starter motor 38 it will also be turned off the coils 27 whereby the spider will be released from the flywheel and forced out of contact therewith by the springs 30.

Among the many advantages arising from the use of my improved device, it should be especially pointed out that the starting gears are constantly in mesh so that they may be long lived and quiet. Next, the clutching means for clutching these gears to the crankshaft is practically indestructible, cheap, efficient, and durable. Moreover, there are no moving parts associated with the starting of the engine except the flywheel of the engine which are rotating when the starter is not being used. On the other hand if any of the parts should ever get out of order, they are all relatively easily removed as the starting motor may be removed as are other starting motors and the brush connection with the electrical clutch is also readily removed for inspection or repair. The coils are preferably constructed from one strip of heavy metal tape and only carry a low voltage so they are neither liable to breakage nor shorting.

Some changes may be made in the arrangement, construction and combination of the various parts of my improved device without departing from the spirit of my invention, and it is my intention to cover by my claims, such changes as may reasonably be included within the scope thereof.

I claim as my invention:

1. In a starting gear, an internal combustion engine having a crankshaft and a flywheel thereon, a starting motor mounted on said engine with its shaft parallel with the axis of the crankshaft, a gear train rotatably mounted on a stationary part of said engine adapted to be permanently in mesh connected with the starting motor, and means for magnetically connecting one of the gears of said gear train with said flywheel when said starting motor is actuated.

2. In a device of the character described, a flywheel housing, a crankshaft extended therein, a flywheel mounted on said crankshaft, a spider rotatably mounted on said flywheel housing, a starting motor mounted on said flywheel housing, a permanent gear connection between said starting motor and said spider, and a magnet mounted on said spider and adapted to draw it into clutching engagement with said flywheel when said magnet is operated.

3. In a device of the character described, a crankcase, a flywheel housing secured thereto, a crankshaft mounted in said crankcase, a flywheel secured to said crankshaft and mounted in said flywheel housing, a starting motor mounted on said flywheel housing, a spider member having external teeth mounted on said flywheel housing for axial and rotary movements, a gear fixed to said starting motor and adapted to permanently mesh with the teeth on said spider, a magnetic coil mounted on said spider, and means for electrically connecting the coil and motor whereby they may be simultaneously actuated.

4. In a device of the character described, an engine having a flywheel, a housing therefor, a spider rotatably and slidably mounted on said flywheel housing so that said spider may rotate and move axially relative to said crankshaft, a starting motor mounted on said flywheel housing, a gear secured to said starting motor adapted to mesh continuously with co-acting teeth on said spider, a magnetic coil mounted on said spider, and means for electrically connecting said coil with said starting motor whereby the coil and starting motor may be actuated simultaneously, and means for insuring electrical connections to said coil during axial and rotary movement of said spider.

5. In a device of the character described, an engine having a flywheel, a housing therefor, a spider rotatably and slidably mounted on said flywheel housing, a starting motor mounted on said flywheel housing, a gear secured to said starting motor adapted to mesh continuously with co-acting teeth on said spider, a magnetic coil mounted on said spider, a brush ring mounted on said spider and electrically insulated therefrom, a brush resiliently mounted on said housing in contact with said brush ring and electrically insulated from said housing, and electrical connections from said magnetic coil to said brush ring.

6. In a device of the character described, a flywheel housing, a crankshaft extended therein, a flywheel mounted on said crankshaft, a member rotatably mounted on said flywheel housing, a starting motor mounted on said flywheel housing, a permanent gear connection between said starting motor and said member, and a magnet mounted on said member and adapted to draw it into clutching engagement with said flywheel when said magnet is operated.

June 4, 1928.

HENRY FORD.